T. A. DUNGAN.
PROCESS FOR PREPARING FERTILIZING MATERIAL.
APPLICATION FILED APR. 3, 1917.

1,257,591. Patented Feb. 26, 1918.

Inventor:
Thomas A. Dungan,

UNITED STATES PATENT OFFICE.

THOMAS A. DUNGAN, OF CHICAGO, ILLINOIS.

PROCESS FOR PREPARING FERTILIZING MATERIAL.

1,257,591.

Specification of Letters Patent.

Patented Feb. 26, 1918.

Application filed April 3, 1917. Serial No. 159,497.

*To all whom it may concern:*

Be it known that I, THOMAS A. DUNGAN, a citizen of the United States, residing at 47 West Garfield Blvd., Chicago, in the county of Cook and State of Illinois, have invented a new and useful Process for Preparing Fertilizing Material, of which the following is a specification.

Figure 1:
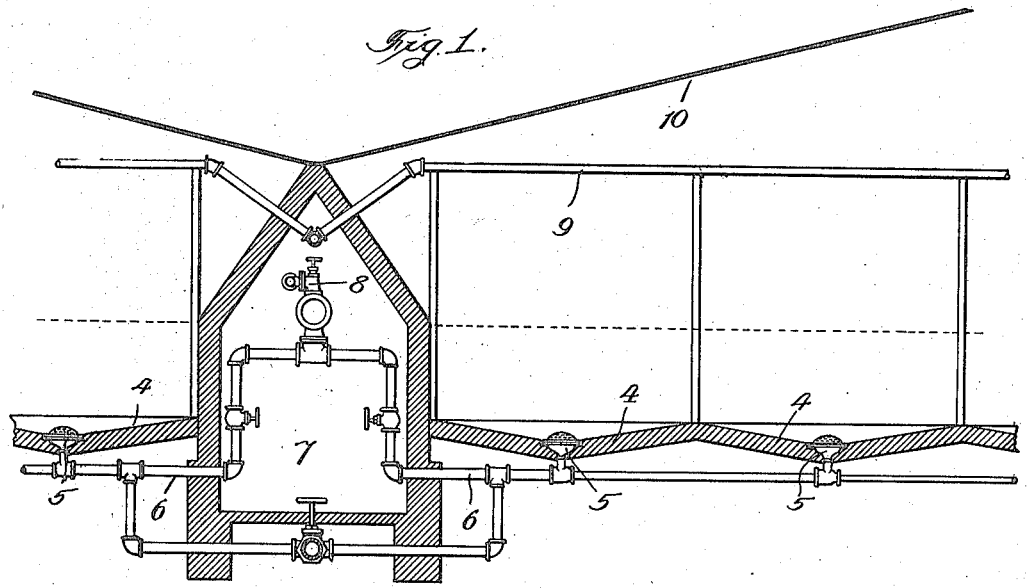
Figure 2:
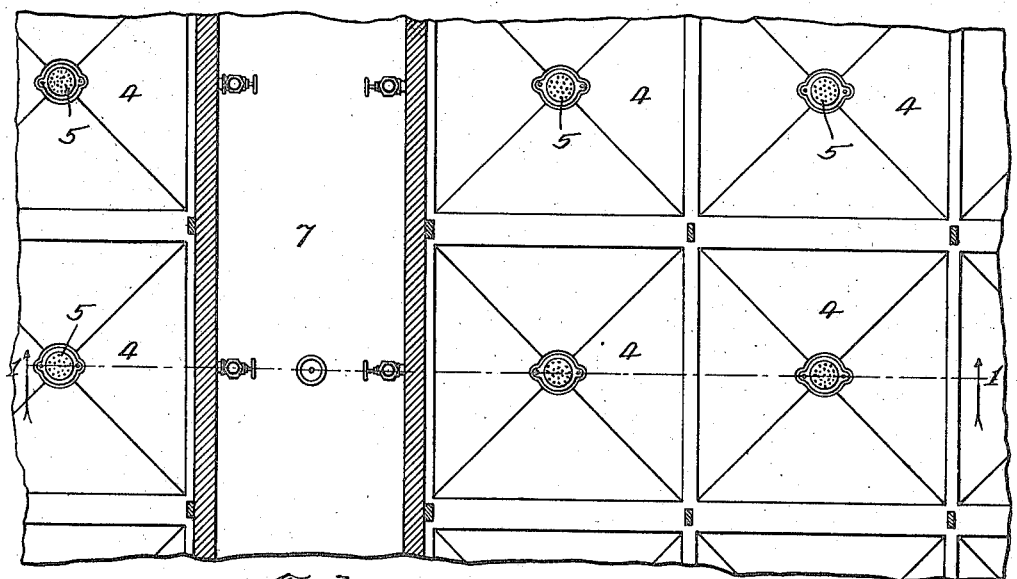
Figure 3:
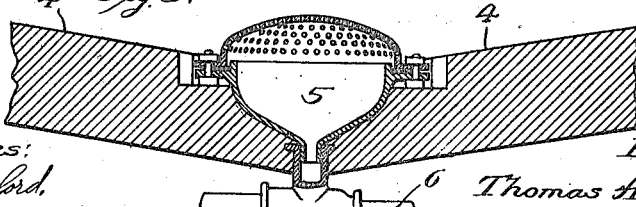

My invention relates to an improved process for preparing fertilizing material and is fully described and explained herein, and an apparatus by which the process may successfully be carried out is illustrated in the accompanying drawings, in which—
Figure 1 is a transverse section on the line 1 of Fig. 2; Fig. 2 is a plan section; and Fig. 3 is a section on the line 3 of Fig. 2.

It has been shown that organic matter such as that contained in dry humus, swamp humus, muck, peat, garbage or sewage sludge, can be treated with certain bacteria to adapt it, or the material containing it, to fertilizing purposes. The identity of the bacteria and the general mode for securing cultures thereof are well known, and they are known to be aerobic bacteria.

I have discovered that the formation of the fertilizer from the material named, and others of like nature, by bacteriological action, can be vastly accelerated by maintaining the material in which the bacteria are developing not only at the proper temperature and with the proper moisture content for maximum bacteriological action, but by forcing air through the material.

To this end I provide a bed 4 divided into a series of spaces each sloping toward its own center and at the center of each I place a perforated head 5 having communication with an air-passage 6. 7 is a hot-air chamber, or tunnel, in which the air is heated to the requisite degree and forced into the pipe 6, by means of the steam jet exhauster 8, by which, by cutting off the air, live steam can also be forced out of the heads 5. 9 are overhead water-pipes by which the material upon the bed 4 can be supplied with moisture.

In the practice of my process the organic material, or the mass of which it forms a part, is placed on the bed and is preferably sterilized by forcing steam through it (although in some cases this step can be omitted) and is inoculated with aerobic bacteria of the selected kind.

Warmed air is then forced up through the material, the air being more or less heated so as to maintain the mass at that temperature which is known to be the best for the particular culture employed, and water is conveniently sprinkled over the mass from the pipes 9. The bacteria can be conveniently introduced with the water supply. If desired the beds can be placed under a roof 10, after the manner of a hot-house. The reactions produced by bacteriological action proceed under these favorable conditions with extreme rapidity, and after a relatively brief treatment the material can be used for fertilizing purposes, or, if the material contain a suitable proportion of earthy material in addition to the organic content, the plant can be grown in the material itself.

What I claim as new and desire to secure by Letters Patent is:

1. The herein described improvement in the art of forming fertilizer from sterilized organic material, which consists in inoculating the material with aerobic bacteria and permitting the bacteria to develop while continuously forcing air through the mass.

2. The herein described improvement in the art of forming fertilizer from organic material, which consists in sterilizing the material, inoculating the material with aerobic bacteria and permitting the bacteria to develop while continuously forcing heated air up from the bottom through the mass to maintain the same at the temperature favoring maximum bacteriological activity.

3. The herein described improvement in the art of forming fertilizer from organic material which consists in first sterilizing the material, then inoculating the material with aerobic bacteria, and permitting the bacteria to develop while continuously forcing heated air through the mass to maintain the same at the temperature favoring bacteriological activity.

4. The herein described improvement in the art of forming fertilizer from organic material which consists in forcing steam through the material to produce substantial sterilization, then simultaneously moistening and inoculating the mass with aerobic bacteria and permitting the bacteria to develop while forcing heated air up through the material to maintain it at a temperature favoring bacteriological development.

In testimony whereof I have hereunto set my hand and seal this 24th day of March, 1917.

THOMAS A. DUNGAN. [L. S.]